United States Patent [19]

Skalny et al.

[11] 4,135,941

[45] Jan. 23, 1979

[54] PROCESS FOR THE PRODUCTION OF PORTLAND TYPE CEMENT CLINKER

[75] Inventors: Jan P. Skalny; Waldemar A. Klemm, both of Ellicott City, Md.

[73] Assignee: Martin Marietta Corporation, Bethesda, Md.

[21] Appl. No.: 790,551

[22] Filed: Apr. 25, 1977

[51] Int. Cl.$^2$ .................................................. C04B 7/02
[52] U.S. Cl. ..................................... 106/100; 106/102
[58] Field of Search ......................................... 106/100

[56] References Cited

U.S. PATENT DOCUMENTS

| | | | |
|---|---|---|---|
| 417,634 | 12/1889 | Duryee | 106/100 |
| 1,904,640 | 4/1933 | Windecker | 106/100 |
| 3,861,928 | 1/1975 | Slater et al. | 106/100 |
| 4,042,408 | 8/1977 | Murray et al. | 106/100 |

*Primary Examiner*—L. Dewayne Rutledge
*Assistant Examiner*—John P. Sheehan
*Attorney, Agent, or Firm*—Gay Chin; George W. Moxon, II; Ronald G. Ort

[57] ABSTRACT

An improved process for producing portland and portland type cement clinker wherein argillaceous and calcareous type materials are ground and blended to form a generally homogeneous mixture and subsequently burned in a kiln at a temperature in the range of about 1200° C. to about 1500° C. to form cement clinker, the improvement comprising incorporating into the mixture a fluorine containing mineral acid, selected from the group comprising fluotitanic acid, fluoboric acid, fluophosphoric acid, fluosilicic acid, and hydrofluoric acid, as a fluxing and mineralizing agent, in an amount of up to 3.0% by weight based upon the weight of the dry solids in the mixture.

9 Claims, No Drawings

PROCESS FOR THE PRODUCTION OF PORTLAND TYPE CEMENT CLINKER

BACKGROUND OF THE INVENTION

This invention relates generally to processes for producing portland and portland type cement clinker, and more particularly to clinkering processes wherein a fluxing and mineralizing agent is incorporated therein.

Portland cement clinker is typically formed by burning an argillaceous type material such as clay, and a calcareous type material such as limestone, in a kiln at a temperature of about 1450° C. for a period of time, generally in excess of one hour, such that the raw materials react to form new compounds which, when mixed with water, will hydrate and set up as a hard mass. In this reaction, the calcareous or limestone material, e.g., $CaCO_3$, in the presence of heat gives off $CO_2$ and becomes CaO or free lime, which then reacts with the silicon dioxide ($SiO_2$), aluminum oxide ($Al_2O_3$), and ferric oxide ($Fe_2O_3$) which are the predominant components of argillaceous or clay type materials. The result is that the free lime (CaO) is consumed and reacted and converted to tricalcium silicate or alite, which is the principal component of portland cement clinker. Other calcium-silicate compositions, such as dicalcium silicate, calcium-aluminate compositions, such as tricalcium aluminate ($3CaO \cdot Al_2O_3$), and calcium-aluminum-iron compositions and/or solid solutions, such as tetracalcium aluminoferrite ($4CaO \cdot Al_2O_3 \cdot Fe_2O_3$), are formed in the reaction and these constitute minor proportions of the resulting clinker composition. A usual, commercial portland cement clinker will contain less than 2.0% by weight free lime, frequently less than 1.0% by weight, and also will contain as much as 55% by weight alite, frequently more than 60% by weight alite.

Portland cement is defined in ASTM C150-74 as a hydraulic cement produced by pulverizing clinker consisting essentially of hydraulic calcium silicates, usually containing one or more forms of calcium sulfate as an interground addition. The chemical requirements specify neither a maximum amount of free lime (CaO) nor a minimum amount of alite, i.e., tricalcium silicate ($3CaO \cdot SiO_2$). The physical requirements are among others, that mortars, the testing of which is specified in ASTM C109-73, made using ASTM Type I portland cement, achieve 3 and 7 day compressive strengths of not less than 1800 psi (pounds per square inch) and 2800 psi, respectively.

In the clinkering process, it is known in the art to add substances in addition to the raw materials, which substances aid in the cement burning, e.g., in the kiln, and these substances are known as fluxing and/or mineralizing agents. As discussed in Lea, *The Chemistry of Cement and Concrete*, 3rd Edition, 1971, Chemical Publishing Company, on pages 156 and 157, these agents lower the temperature at which liquid or melt is formed (in the burning process) and thus the clinkering temperature. Examples given in Lea are calcium fluoride ($CaF_2$) and the fluosilicates, such as sodium, magnesium and calcium fluosilicate.

Normally, a flux is a substance which decreases the melting point of the liquid phase, while a mineralizer is a substance which increases the rate of a process and/or reaction occurring within the solid phase, the liquid phase or at the liquid-solid interface. Fluorspar ($CaF_2$) functions as both a flux and a mineralizer; it lowers the temperature at which liquid is formed, thus reducing the clinkering temperature; and it also increases the reactivity of free lime with intermediary clinker materials.

In addition to lowering the clinkering temperature, fluxes have been used to facilitate clinkering. For example, in 1887, LeChatelier used both calcium chloride and calcium fluoride in his attempts to synthesize pure tricalcium silicate. Further the burnability of difficult-to-clinker mixes, such as low liquid phase compositions, e.g., white portland cement, which is more difficult to burn because of the absence of the iron compounds which partly form the liquid phase, is enhanced using fluxes, such as cryolite ($Na_3AlF_6$) which has been used to aid in burning white portland cement clinker where iron contamination is to be avoided.

With the growing scarcity and unavailability of energy, there is an increasing need for new and/or alternative ways of saving and reducing the amount of energy needed for producing cement. For example as reported in *Energy Conservation Potential in the Cement Industry*, a report by the Portland Cement Association for the Federal Energy Administration, published as Conservation Paper No. 26, June, 1975, today in the U.S., a typical cement kiln is operated at a temperature of approximately 1450° C., and averages about 1600 kcal/kg of cement produced, and so even a modest reduction (100° C.) in the kiln burning temperature could result in energy savings on the order of 150 kcal/kg of clinker. Since fluxing and mineralizing agents reduce the clinkering temperature, there is a corresponding need for improved and/or alternative fluxing and/or mineralizing agents.

SUMMARY OF THE INVENTION

The present invention is directed generally to a process for producing portland type cement clinker, and more specifically to an improved process for producing portland type cement clinker using a fluxing and/or mineralizing agent.

The present invention has resulted from the unexpected discovery that certain fluorine containing inorganic or mineral acids provide unexpected levels of fluxing and mineralizing in manufacturing portland cement clinker and result in greater energy savings than do the known prior art fluxing and mineralizing agents.

For the purposes of this application, the terms fluorine containing mineral acid and fluorine containing inorganic acid are used interchangeably and are intended to mean acids comprised of inorganic elements and containing fluorine as a constituent. The fluorine containing mineral or inorganic acid can be, for example, fluotitanic acid or hexafluorotitanic acid or dihydrogen hexafluorotitanate ($H_2TiF_6$), fluoboric acid or tetrafluoroboric acid ($HBF_4$), fluophosphoric acid, such as fluorophosphoric acid or phosphorofluoridic acid ($H_2PO_3F$), difluorophosphoric acid or phosphorodifluoridic acid ($HPO_2F_2$) and hexafluorophosphoric acid or hydrogen hexafluorophosphate ($HPF_6$), fluosilicic acid or hexafluorosilicic acid or dihydrogen hexafluorosilicate ($H_2SiF_6$) and hydrofluoric acid (HF). Fluotitanic and fluosilicic acids are the preferred fluorine containing mineral acids.

The fluorine containing mineral acid is employed to flux and/or mineralize portland or portland type cement raw material in an amount of up to 3.0% by weight based upon the weight of the dry solids in the raw material to be burned and converted into clinker. A preferred addition is in an amount in the range of from about 0.1% by weight to about 1.0% by weight, with the range 0.2% by weight to 0.5% by weight being an additional preferred range.

For the purposes of this invention, the term portland type cement is intended to include all cementitious compositions which are portland cement, or are chemically similar or analogous to portland cement, the specification for portland cements being set forth in ASTM C150-76a. This would include white cements, expansive portland cement, regulated set cements, as well as cements in which fly ash, such as from steam or power generating stations, pozzolana slag, such as from blast furnaces, alkali waste, such as precipitated calcium carbonate obtained as a by-product in the alkali and synthetic ammonium sulphate industries, or mixtures of these are incorporated in and result in a portland type cement. Thus, a wide variety of argillaceous and calcareous type raw materials can be employed to make portland type cement clinker and ultimately portland type cement.

Basically, the process comprises incorporating the fluorine containing inorganic acid into the raw materials to be burned either by adding it to dried raw material which then passes directly to the kiln or by adding it to raw material which is in the form of a slurry and which is subjected to a "wet" process burning or undergoes a subsequent drying step prior to the burning step. By either method, the burning step is rendered easier and requires less energy to convert the raw material into portland type cement clinker.

It is therefore an object of the present invention to provide an improved process for producing portland and portland type cement clinker.

These and other objects and advantages of the invention will become apparent on consideration of the description and discussion which follows.

DETAILED DESCRIPTION OF THE INVENTION

As is old and well known in the cement processes of the art, the kiln feed may be processed to portland type cement clinker by either the "dry" process or the "wet" process.

Typically in a "dry" process, the admixture of argillaceous and calcareous type materials is proportioned, ground and blended. The mixed materials then pass through raw grinding mills, in which the fineness is brought to about 200 mesh. The raw materials are then passed to the cement kiln and burned in the usual manner to a portland type cement clinker.

In a typical "wet" process, the admixture of components is proportioned, made into a slurry with water and ground to a uniform fineness, approximately 200 mesh (Tyler), the water content of the slurry usually being between 30% and 40%. This slurry is fed to the cement kiln and burned to a portland type cement clinker, the water content of the slurry being volatilized and carried over as steam with the kiln gases.

No attempt will be made in the present instance to describe in any detail the processes involved in drying, proportioning, grinding and preparing the raw materials required to the kiln feed, the burning of the mix to clinker or the subsequent treatment of the clinker in the manufacture of the various types of portland cement. All of this is well known to persons skilled in the art.

If the "wet" process is employed in the process of this invention, the fluorine containing inorganic acid can be added as a concentrate or as a more dilute solution along with the water employed to make the kiln feed slurry. If the "dry" process is employed, a more concentrated form of the acid may be used.

What is critical to the present invention is that the flux be a fluorine containing inorganic acid, and be included in certain amounts. The fluorine containing inorganic or mineral acid can, for example, comprise fluotitanic or hexafluorotitanic acid ($H_2TiF_6$), fluoboric or tetrafluoroboric acid ($HBF_4$), fluophosphoric acids, such as fluorophosphoric or phosphorofluoridic acid ($H_2PO_3F$), difluorophosphoric or phosphorodifluoridic acid ($HPO_2F_2$) and hexafluorophosphoric acid ($HPF_6$), fluosilicic or hexafluorosilicic acid ($H_2SiF_6$) and hydrofluoric acid or hydrogen fluoride (HF), with fluosilicic and fluotitanic acids being preferred. Hydrogen fluoride usually occurs as a gas, as compared to hydrofluoric acid which is a water solution of hydrogen fluoride. Although the gaseous form is less preferred than the solution form of HF in view of the handling problems, etc., it is nonetheless considered to be within the scope of the present invention.

The fluorine containing inorganic acid is employed in an amount of up to 3.0% by weight based upon the weight of the dry solids in the raw material to be burned and converted into clinker, preferably in an amount in the range of from about 0.1% to 1.0% by weight with the range of from 0.2% to 0.5% by weight being also preferred, and can be used to flux and/or mineralize any portland or portland type cement raw material.

The fluorine containing acids to be employed can be pure reagent grade acids or industrial grade acids, such as those which are the by-product of other chemical reactions. For example, fluosilicic acid is a by-product of phosphoric acid manufacture and is produced as an aqueous solution at a concentration which usually varies between 23% by weight and 25% by weight. Industrial grade fluosilicic acid solution may also contain about 0.1% by weight $P_2O_5$ and about 15 ppm of heavy metals. Further in the industrial grade solution, a slight excess of free HF may be present in the solution to stabilize it and prevent any silica precipitation.

To give those skilled in the art a better understanding of the invention, a number of examples were run. The examples are offered merely by way of illustration, and it is not intended that they be taken as limiting the scope of the invention. In the examples, three raw feeds were used, and the typical analyses of these feeds, as well as their predicted, potential clinker mineral compositions, which have been calculated from their analyses using the Bogue equations as is known in the art, are set forth in the following Table I. A discussion of the Bogue equations and the method of calculating the potential cement compounds is set forth on pages 114–117 of Lea, *The Chemistry of Cement and Concrete*, Third Edition, 1971, Chemical Publishing Co. The feeds were industrial feeds, i.e., were obtained from the feed end of kilns producing commercially available cements, and these are hereinafter identified as raw feeds, A, B and C. Raw feeds A and B are Type I portland cement raw feeds with raw feed A being produced for use in a wet process and raw feed B being produced for use in a dry process, while feed C is a white portland cement raw feed, which is normally more difficult to burn and is produced for use in a dry process.

Table 1

Kiln Feed Analyses

| Ingredient | Actual Composition (Percent by Weight) | | |
|---|---|---|---|
| | Raw Feed A | Raw Feed B | Raw Feed C |
| $SiO_2$ | 13.88 | 13.87 | 15.23 |
| $Al_2O_3$ | 3.27 | 3.99 | 2.99 |
| $Fe_2O_3$ | 1.42 | 1.74 | 0.54 |
| CaO | 42.67 | 42.49 | 44.88 |
| MgO | 2.03 | 0.95 | 0.92 |
| $SO_3$ | 0.70 | 2.05 | 0.15 |
| $Na_2O$ | 0.16 | 0.2(Est.) | 0.2(Est.) |
| $K_2O$ | 0.67 | 0.65 | 0.36 |
| LOI (Loss on Ignition at 950° C.) | 35.52 | 34.45 | 35.39 |

| | Potential Cement Compounds (Percent by Weight) | | |
|---|---|---|---|
| $C_3S$ | 65.2 | 49.2 | 70.0 |
| $C_2S$ | 12.3 | 23.2 | 14.1 |
| $C_3A$ | 9.7 | 11.6 | 10.7 |
| $C_4AF$ | 6.7 | 8.0 | 2.5 |

EXAMPLE I

The raw feeds A, B and C were used as received, except that raw feed A was screened to remove all particles larger than 50 mesh (Tyler). This removed about 3% by weight of the total feed, but did not significantly change the composition of the feed. Next, an amount of about 1.0% by weight of $H_2SiF_6$, in the form of commercially available fluosilicic acid solution, which is the by-product of phosphoric acid manufacture and contains about 24% by weight $H_2SiF_6$, about 0.1% by weight $P_2O_5$ and 15 ppm of heavy metals (as lead), was added and thoroughly blended with each of the feeds which were in a dry form. After blending, the mixtures were clinkered, along with control samples which contained no flux, by heating them in platinum dishes at 1200° C. for periods of 0.5 hours, 1.0 hour, and 2.0 hours. After clinkering, the quantity of unreacted lime (CaO), also known as free lime, remaining after heating was determined by X-ray diffraction analysis.

In X-ray diffraction analysis, a sample is exposed to a beam of X-rays, and the diffraction pattern is used to identify the particular crystal structure and hence composition of the crystalline solid. For the purpose of the X-ray diffraction analysis tests involving this application, the CaO peak was measured at 37.3° $2\theta$ (theta). Day-to-day variations in X-ray tube intensity were corrected by also running a novaculite (alpha-quartz) intensity standard, and then normalizing all data by the daily novaculite intensity ratio. Free lime content was obtained from a calibration curve constructed from samples which were independently analyzed by a wet chemical method given in ASTM C-114.

The results, which are set forth in Table II, demonstrate the effect of the flux in the clinkering process. The raw feed C contained a relatively high level of free lime after burning, but nonetheless the use of a fluorine containing acid reduced that level of free lime and domostrated the effect of such acids in a mix which is very difficult to burn.

Table II

Free Lime Content of Raw Feed Samples Containing 1.0% By Weight $H_2SiF_6$ and Burned at 1200° C. for Various Times

| Raw Feed | Time (Hr) | Temperature (° C.) | Free Lime (%) | |
|---|---|---|---|---|
| | | | Control | 1.0% $H_2SiF_6$ |
| A | 0.5 | 1200 | 17.3 | 5.6 |
| | 1 | 1200 | 16.6 | 2.8 |
| | 2 | 1200 | 16.4 | 1.6 |

Table II-continued

Free Lime Content of Raw Feed Samples Containing 1.0% By Weight $H_2SiF_6$ and Burned at 1200° C. for Various Times

| Raw Feed | Time (Hr) | Temperature (° C.) | Free Lime (%) | |
|---|---|---|---|---|
| | | | Control | 1.0% $H_2SiF_6$ |
| B | 0.5 | 1200 | 22.5 | 4.4 |
| | 1 | 1200 | 21.3 | 1.9 |
| | 2 | 1200 | 20.8 | 1.2 |
| C | 0.5 | 1200 | 56.4 | 24.9 |
| | 1 | 1200 | 51.2 | 22.4 |
| | 2 | 1200 | 49.8 | 17.8 |

EXAMPLE II

Varying amounts of fluosilicic acid ($H_2SiF_6$) in the form of the fluosilicic acid solution of Example I, were added to wet and dry raw feed A. In this example, the oversized particles in the feed, which are retained on a 50 mesh screen (Tyler) and had been screened out in the previous example, were ground and blended back into the screened bulk material. The raw feed which was in a dried condition was divided into two portions. One portion was designated a dry feed, and the other portion was reconstituted into an about 30% by weight water slurry by the addition of water to form a wet or slurry feed. With the dry feed, the flux was blended into the dry feed, and then the mixture was burned. With the wet feed, the resulting mixture was dried prior to burning (or clinkering), by heating the mixture to 105° C. for several hours until it had a dry appearance. While the wet feed examples are not the same as those in a wet burning process, there are a number of similarities. In each case the burning was, along with a control sample which contained no flux, for 1 hour at 1300° C. in platinum dishes, and the results are shown in Table III which follows:

Table III

Free Lime and Alite Contents of Raw Feed A Containing $H_2SiF_6$ Mixed With Wet or Dry Feed, and Burned 1 hour at 1300° C.

| $H_2SiF_6$ Addition (% by weight) | Feed Condition | Free CaO (% by weight) | Alite (% by weight) |
|---|---|---|---|
| 0 | wet | 8.6 | 35 |
| 0.125 | wet | 5.6 | 47 |
| 0.25 | wet | 2.3 | 58 |
| 0.50 | wet | 1.5 | 58 |
| 0.25 | dry | 4.2 | 48 |
| 0.50 | dry | 2.3 | 52 |

Both the free lime and alite (tricalcium silicate) contents were obtained by X-ray diffraction. For this purpose, the alite peak occurring at 51.8° $2\theta$ was measured. The alite content represents comparative estimates based upon interpolations from the Bogue calculated value of potential alite content from a well-burned clinker obtained using raw feed A, which did not contain flux. The results show that the fluorine containing acid can be added to either a wet or a dry feed. Further, an apparently more thorough mixing of the flux and raw feed is achieved with a wet feed since higher alite and lower free lime values were achieved.

EXAMPLE III

Various amounts of $H_2SiF_6$, in the form of the fluosilicic acid solution of Example I, as well as comparative additions of various amounts of powdered $CaF_2$, a conventional fluxing agent, were added to the reconstituted (about 30% moisture content) raw feed A slurry of Example II. After drying, the mixtures, as well as control samples which contained no flux, were burned for 1 hour at 1200° C., 1250° C., 1300° C. and 1350° C. in platinum dishes. The results which were obtained by X-ray diffraction and which are set forth in Table IV (all percentages are by weight), show that the use of the fluorine containing inorganic acid flux, namely fluosilicic acid solution, unexpectedly results in a more thorough burning of the raw feed than does the use of $CaF_2$ flux, and further that each of these is better than not using any flux, for all of the temperatures involved.

Table IV

Free Lime and Alite Contents of Raw Feed A With The Flux Added to a Slurry and Burned 1 Hour at Various Temperatures

| Flux | Amount (%) | Free CaO(%) | | | |
|---|---|---|---|---|---|
| | | 1200° C. | 1250° C. | 1300° C. | 1350° C. |
| None | 0 | 21.3 | 15.2 | 8.0 | 5.9 |
| $H_2SiF_6$ | 0.125 | 15.6 | 11.1 | 5.2 | 3.6 |
| " | 0.25 | 11.4 | 7.7 | 2.5 | 2.1 |
| " | 0.50 | 5.6 | 3.5 | 1.3 | 0.7 |
| $CaF_2$ | 0.25 | 15.7 | 12.3 | 5.9 | 5.8 |
| " | 0.50 | 12.5 | 9.4 | 3.0 | 2.5 |

| | | Alite (%) | | | |
|---|---|---|---|---|---|
| | | 1200° C. | 1250° C. | 1300° C. | 1350° C. |
| None | 0 | 3 | 19 | 42 | 59 |
| $H_2SiF_6$ | 0.125 | 21 | 29 | 50 | 60 |
| " | 0.25 | 31 | 36 | 58 | 58 |
| " | 0.50 | 41 | 48 | 60 | 60 |
| $CaF_2$ | 0.25 | 24 | 34 | 56 | 57 |
| " | 0.50 | 29 | 34 | 54 | 62 |

EXAMPLE IV

A dry sample of 1800 grams of as received raw feed A (i.e., including all oversize particles), was thoroughly mixed and blended with 0.5% by weight (based upon the weight of the dry solids in the raw feed) of $H_2SiF_6$, in the form of the fluosilicic acid solution of Example I. The mix was then divided into six equal parts, placed in platinum dishes, and burned for 2 hours at 1300° C. The so formed clinker was reblended and the complete oxide composition and free lime contents were determined by the wet method of ASTM C114-69, as well as the free lime and alite contents, by X-ray diffraction analysis. In addition, the potential clinker compositions were calculated from the oxide composition using the Bogue equations. The results are shown in Table V. Next, the clinker was ground in a ceramic ball mill to a Blaine fineness (ASTM C204-73 air permeability method) of 3450 cm²/g. and blended with 0.0%, 3.0%, and 5.0% gypsum ($Ca_2SO_4 \cdot 2H_2O$). The cements hydrated in a normal manner, and the clinker containing 5% gypsum (an amount which is usually found in portland cements) was subject to a modified Vicat setting time determination and indicated an initial set at 3½ hours and a final set at 7 hours. The procedure was modified in order to accommodate for the fact that the amount of cement produced was not in a sufficient quantity to be subjected to the normal Vicat test. In addition, the clinker containing 5% gypsum was used to make nine 2-inch (50-mm) cement mortar cubes having a cement to sand ratio of 1:2.75, a water cement ratio of 0.485 and being in accordance with ASTM C-109-73. The resulting compressive strengths are set forth in Table VI in pounds per square inch, with these values in megapascals (MPa) being given parenthetically. As can be seen, mortars made with cement clinkers fluxed in accordance with the teachings of the present invention exceed the compressive strengths set forth in the ASTM requirements for portland cement (ASTM C150-76a).

Table V

Analysis of Fluxed Clinker for Raw Feed A Containing 0.5% by Weight Flux

| Ingredient | Actual Composition (% by Weight) | |
|---|---|---|
| | Wet Analysis | X-Ray Diffraction Analysis |
| $SiO_2$ | 21.55 | |
| $Al_2O_3$ | 5.25 | |
| $Fe_2O_3$ | 2.05 | |
| FeO | nil | |
| CaO | 65.30 | |
| MgO | 3.20 | |
| $SO_3$ | 0.65 | |
| Sulfide S | nil | |
| $Na_2O$ | 0.20 | |
| $K_2O$ | 0.40 | |
| Free CaO | 1.45 | 2.1 |
| Potential Composition (% by Weight) | | |
| $C_3S$ | 62.0 | 60 |
| $C_2S$ | 15.0 | |
| $C_3A$ | 10.4 | |
| $C_4AF$ | 6.2 | |

Table VI

| Test Time (days) | Compressive Strength psi (MPa) | Standard Deviation psi (MPa) |
|---|---|---|
| 1 | 915 (6.31) | ±7 (0.04) |
| 7 | 4079 (28.12) | ±48 (0.33) |
| 28 | 4779 (32.95) | ±210 (1.44) |

EXAMPLE V

The same steps as in Example IV were repeated, except that raw feed was reduced so that all of it passed a 50 mesh screen (Tyler) as was the practice in Example II and was in the form of an about 30% moisture content slurry and the amount of fluosilicic acid was 0.25% by weight based upon the weight of the dry solids in the raw material. The so formed clinker was analyzed using the wet (ASTM C114-69) method, and the potential compound composition was calculated using the Bogue equations and these values are set forth in Table VII. In addition, compressive strengths of a sample of clinker containing 5% by weight gypsum were run in accordance with ASTM C109-73, and they are set forth in Table VIII. As is seen, mortars made from clinker fluxed with a fluorine containing mineral acid achieve compressive strengths in excess of those required by ASTM C150-74.

Table VII

Analysis of Fluxed Clinker for Raw Feed A Containing 0.25% by Weight Flux

| Ingredient | Actual Composition (% by Weight) | |
|---|---|---|
| | Wet Analysis | X-Ray Diffraction Analysis |
| $SiO_2$ | 21.76 | |
| $Al_2O_3$ | 5.00 | |
| $Fe_2O_3$ | 2.20 | |
| CaO | 66.10 | |
| MgO | 3.03 | |
| $Na_2O$ | 0.18 | |
| $K_2O$ | 0.68 | |
| FeO | 0.02 | |
| $SO_3$ | 0.77 | |
| Sulfide S | 0.006 | |
| Free CaO | 1.97 | 2.5 |
| LOI | 0.37 | |
| Potential Clinker Composition (% by Weight) | | |
| $C_3S$ | 64.8 | 61 |
| $C_2S$ | 13.5 | |
| $C_3A$ | 9.5 | |
| $C_4AF$ | 6.7 | |

Table VIII

| Test Time (days) | Compressive Strength psi (MPa) | Standard Deviation psi (MPa) |
|---|---|---|
| 1 | 1563 (10.77) | ±14 (0.10) |
| 7 | 4504 (31.05) | ±47 (0.32) |
| 28 | 5158 (35.56) | ±139 (0.95) |

EXAMPLE VI

In order to demonstrate the wide variety of fluorine containing acids which can be employed as fluxing agents in accordance with the teachings of the present invention, samples were made using the raw feed A of Example II, reconstituted to a slurry by the addition of water in an amount about 30% by weight, and various amounts of five different fluorine containing mineral acid fluxing agents, mostly in the form of acid solutions. The percentage by weight of the acid in the solution is indicated parenthetically. The acids used were those which are commercially available.

The samples were burned for one hour at various temperatures in platinum dishes, along with control samples in which no flux was added. The resulting clinkers were analyzed by X-ray diffraction to determine their alite and free lime contents. The results which are set forth in Table IX (the percentages are by weight), clearly demonstrate the usefulness of a wide variety of fluorine containing acids as fluxing agents.

Table IX

Free Lime and Alite Contents of Raw Feed A and Flux Burned 1 Hour at Various Temperatures

| Flux | Amount (%) | Free CaO(%) 1200° C. | 1250° C. | 1300° C. | 1350° C. |
|---|---|---|---|---|---|
| $H_2TiF_6$(60%) | 0.25 | 8.4 | 7.6 | 2.3 | 1.4 |
|  | 0.50 | 5.4 | 3.8 | 0.9 | 0.5 |
| $HBF_4$(48%) | 0.25 | 14.1 | 11.7 | 4.3 | 2.5 |
|  | 0.50 | 11.2 | 6.6 | 1.2 | 2.0 |
| $HPO_2F_2$(100%) | 0.25 | 13.5 | 11.1 | 3.4 | 1.9 |
|  | 0.50 | 9.2 | 7.0 | 2.8 | 2.9 |
| $HPF_6$(60%)* | 0.25 | 2.9 | 1.0 | 1.2 | 0.7 |
|  |  | 16.9 | — | 4.3 | — |
|  | 0.50 | 6.7 | 4.0 | 1.5 | 1.3 |
|  |  | 9.6 | — | 1.3 | — |
| $H_2SiF_6$(24%) | 0.25 | 9.2 | 8.1 | 3.0 | 1.5 |
|  | 0.50 | 8.6 | 4.3 | 1.1 | 1.2 |
| None | 0. | 18.9 | 12.8 | 7.1 | 4.5 |
|  | 0. | 20.5 | 16.1 | 6.2 | 5.3 |

| Flux | Amount (%) | Alite(%) 1200° C. | 1250° C. | 1300° C. | 1350° C. |
|---|---|---|---|---|---|
| $H_2TiF_6$(60%) | 0.25 | 31 | 34 | 55 | 60 |
|  | 0.50 | 42 | 52 | 59 | 67 |
| $HBF_4$(48%) | 0.25 | 16 | 22 | 51 | 57 |
|  | 0.50 | 28 | 40 | 57 | 57 |
| $HPO_2F_2$(100%) | 0.25 | 17 | 25 | 58 | 56 |
|  | 0.50 | 31 | 39 | 54 | 57 |
| $HPF_6$(60%)* | 0.25 | 45 | 39 | 66 | 64 |
|  |  | 15 | — | 53 | — |
|  | 0.50 | 36 | 51 | 57 | 61 |
|  |  | 34 | — | 56 | — |
| $H_2SiF_6$(24%) | 0.25 | 31 | 32 | 58 | 61 |
|  | 0.50 | 36 | 46 | 61 | 60 |
| None | 0. | 3 | 26 | 53 | 57 |
|  | 0. | 8 | 22 | 54 | 57 |

*The initial data generated (which is also the first occurring) using $HPF_6$ appeared to be in error and so a second run with a fresh sample, at 1200° C. and 1300° C., but not 1250° C. and 1350° C., was run to verify the initial numbers. While the second run was higher, it was still less than control, but since the retest did not show the initial data to be erroneous, both sets of data are included.

EXAMPLE VII

To samples of the raw feed A of Example II, reconstituted to a slurry by the addition of about 30% by weight water, were added varying amounts of four fluorine containing acids in the form of acid solutions, with the amount of acid indicated parenthetically, and four of the calcium salts of such acids in the form of solid powders of which $CaF_2$ and $CaSiF_6 . 2H_2O$ are known as fluxing agents. These mixtures, as well as control samples in which no flux was added, were then burned in platinum dishes for one hour at 1200° C. and at 1300° C. The resulting clinkers were then analyzed, by X-ray analysis, for free lime and alite contents. The percentages, in percent by weight, which are set forth in Table X, demonstrate the unexpected high levels of fluxing that the fluorine containing acids achieve over their salts, and in fact most of the acids proved superior to $CaF_2$.

Table X

Free Lime and Alite Contents of Raw Feed A With 0.25% Flux Added to a Slurry and Burned 1 Hour at Various Temperatures

| Flux | Amount (%) | Free Lime (%) 1200° C. | 1300° C. | Alite (%) 1200° C. | 1300° C. |
|---|---|---|---|---|---|
| HF(49%) | 0.25 | 11.2 | 2.9 | 33 | 61 |
| $CaF_2$ | 0.25 | 15.4 | 3.8 | 22 | 55 |
| $H_2TiF_6$(60%) | 0.25 | 10.6 | 2.8 | 34 | 59 |
| $CaTiF_6$ | 0.25 | 13.6 | 3.4 | 21 | 58 |
| $H_2SiF_6$(24%) | 0.25 | 12.1 | 3.2 | 32 | 58 |
| $CaSiF_6 . 2H_2O$ | 0.25 | 16.4 | 3.4 | 20 | 56 |
| $HBF_4$(48%) | 0.25 | 14.8 | 3.6 | 19 | 57 |
| $Ca(BF_4)_2 . H_2O$ | 0.25 | 17.0 | 4.7 | 13 | 56 |

Table X-continued

Free Lime and Alite Contents of Raw Feed A With 0.25%
Flux Added to a Slurry and Burned 1 Hour at Various Temperatures

| Flux | Amount (%) | Free Lime (%) 1200° C. | Free Lime (%) 1300° C. | Alite (%) 1200° C. | Alite (%) 1300° C. |
|---|---|---|---|---|---|
| None | 0. | 20.2 | 7.8 | 2 | 44 |

EXAMPLE VIII

To samples of the raw feed A of Example II, wherein the particles over 50 mesh were reduced to less than 50 mesh and reblended in, reconstituted to a slurry by the addition of about 30% by weight water, were added 0.25% by weight, based upon the weight of the dry solids in the raw feed, of two known prior art fluxing agents, namely fluorspar ($CaF_2$) and calcium fluosilicate ($CaSiF_6 \cdot 2H_2O$), and a fluorine containing mineral acid fluxing agent in accordance with the teachings of the present invention, namely fluosilicic acid ($H_2SiF_6$). These mixes, as well as control samples to which no flux was added, were then burned in platinum dishes for one hour at various temperatures between 1300° C. and 1450° C. The particular kiln employed held six samples, and so duplicate samples were run containing fluorspar and calcium fluosilicate. The resulting clinkers were then analyzed for % free lime and % alite contents using the aforementioned X-ray diffraction analysis technique. The percentages, which are set forth in Table XI and are expressed as percent by weight, demonstrate the unexpectedly high levels of fluxing which the fluorine containing mineral acids achieve in comparison to known prior art fluxing agents.

Table XI

Free Lime and Alite Contents of Raw Feed A, which was Burned
for 1 Hour at various temperatures and to which was added 0.25%
of two prior art fluxes and one flux in accordance with the present invention

| Flux | Amount (%) | Free Lime (%) 1300° C. | Free Lime (%) 1350° C. | Free Lime (%) 1400° C. | Free Lime (%) 1450° C. |
|---|---|---|---|---|---|
| None | 0 | 8.3 | 4.6 | 3.7 | 1.9 |
| $CaF_2$ | 0.25 | 5.2 | 4.0 | 3.4 | 2.7 |
| " | 0.25 | 4.6 | 4.2 | 3.2 | 2.4 |
| $CaSiF_6 \cdot 2H_2O$ | 0.25 | 5.7 | 3.6 | 3.7 | 1.3 |
| " | 0.25 | 5.1 | 3.2 | 3.1 | 1.2 |
| $H_2SiF_6$ | 0.25 | 3.5 | 2.5 | 1.9 | 0.9 |

| Flux | Amount (%) | Alite (%) 1300° C. | Alite (%) 1350° C. | Alite (%) 1400° C. | Alite (%) 1450° C. |
|---|---|---|---|---|---|
| None | 0 | 41 | 54 | 58 | 64 |
| $CaF_2$ | 0.25 | 54 | 58 | 63 | 67 |
| " | 0.25 | 56 | 59 | 61 | 66 |
| $CaSiF_6 \cdot 2H_2O$ | 0.25 | 53 | 58 | 61 | 64 |
| " | 0.25 | 54 | 55 | 58 | 66 |
| $H_2SiF_6$ | 0.25 | 54 | 59 | 61 | 72 |

Thus as has been shown, the use of fluorine containing mineral acids in accordance with the teachings of the present invention facilitates the burning of hard to burn raw portland type cement mixes, as well as reducing the amount of energy necessary to burn raw feed mixes to produce portland type cement clinker. When the fluorine containing mineral acid is used in the preferred amount of between about 0.2% to 0.5% by weight based upon the weight of the dry solids in the raw feed, mixed using the wet mixing with a raw feed which has been reduced to pass 50 mesh (Tyler), and burned at about 1300° C. for between about 1 and 2 hours, it is expected that the maximum combination of benefits will be achieved. That is, the cement clinker produced will be achieved with a reduced energy consumption while containing high amounts of alite and low amounts of free lime.

It is well understood by those skilled in the art that certain differences are to be expected in the scale-up of the cement making process from the laboratory to the industrial level. Such differences will include the residence time of the raw feed within the burning zone of the kiln and the actual temperature required under such conditions to achieve the beneficial results taught by the subject invention. Thus, while there are differences, it is expected that a scale-up can be done by those of ordinary skill in the art.

The precise results in scaling-up are difficult to predict since, as is well known in the art, the burning of a raw feed in a cement kiln is an extremely imprecise process. The temperature in the burning zone can fluctuate as much as 100° C. and the composition and fineness of the raw feed is not controlled with scientific exactness. Therefore, the precise amount of fluorine containing mineral acid to be employed may need to be adjusted within the discussed range according to the specific kiln conditions. Further, the amount of fluorine containing mineral acid could be employed in an amount of up to about 3.0% by weight based upon the weight of the dry solids in the raw feed since fluorine containing compounds, usually $CaF_2$, have been included in cement clinkers in amounts up to 3.0% by weight. Amounts in excess of 3.0% by weight will begin to produce adverse effects on the compressive strengths of the resulting cements.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

What we claim is:

1. In the process for producing portland cement clinker wherein argillaceous and calcareous type materials are ground and blended to form a generally homogeneous mixture and subsequently burned in a kiln at a temperature in the range of about 1200° C. to about 1500° C. to form cement clinker, the improvement comprising incorporating into said mixture a fluorine containing mineral acid selected from the group consisting of fluosilicic acid, fluotitanic acid, fluoboric acid, and fluophosphoric acid as a fluxing and mineralizing agent in an amount of up to 3.0% by weight based upon the weight of the dry solids in said mixture.

2. A process according to claim 1 wherein said acid comprises fluosilicic or fluotitanic acid.

3. A process according to claim 1 wherein said acid comprises fluosilicic acid.

4. A process according to claim 3 wherein said fluosilicic acid is in the form of a fluosilicic acid solution which comprises about 25% by weight $H_2SiF_6$.

5. A process according to claim 1 wherein said acid comprises fluotitanic acid.

6. A process according to claim 5 wherein said fluotitanic acid is in the form of a fluotitanic acid solution which comprises 60% by weight $H_2TiF_6$.

7. A process according to claim 1 wherein said fluorine containing acid is present in an amount of between about 0.1% and about 1.0% by weight based upon the weight of the dry solids in said mixture.

8. A process according to claim 1 wherein said acid is present in an amount of between about 0.2% and 0.5% by weight based upon the weight of the dry solids in said mixture.

9. A process according to claim 1 wherein said mixture comprises a slurry and said fluorine containing mineral acid is added to the slurry as an acid solution.

* * * * *